(12) United States Patent
Tang et al.

(10) Patent No.: US 10,805,923 B2
(45) Date of Patent: Oct. 13, 2020

(54) ALLOCATING TRANSMISSION RESOURCES IN COMMUNICATION NETWORKS THAT PROVIDE LOW LATENCY SERVICES

(71) Applicant: HUAWEI TECHNOLOGIES CO.,LTD., Shenzhen, Guangdong (CN)

(72) Inventors: Hao Tang, Shanghai (CN); Dongdong Wei, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/188,200

(22) Filed: Nov. 12, 2018

(65) Prior Publication Data
US 2019/0082433 A1    Mar. 14, 2019

Related U.S. Application Data

(63) Continuation of application No. PCT/CN2016/081852, filed on May 12, 2016.

(51) Int. Cl.
*H04W 4/00* (2018.01)
*H04W 72/04* (2009.01)
(Continued)

(52) U.S. Cl.
CPC ......... *H04W 72/044* (2013.01); *H04W 72/10* (2013.01); *H04W 72/1247* (2013.01)

(58) Field of Classification Search
CPC ............... H04W 72/044; H04W 72/10; H04W 72/1247
See application file for complete search history.

(56) References Cited

U.S. PATENT DOCUMENTS

2009/0201875 A1*  8/2009  Hasegawa ......... H04W 72/1242
                                                  370/329
2010/0008348 A1    1/2010  Zhang et al.
(Continued)

FOREIGN PATENT DOCUMENTS

CN    101778428 A    7/2010
CN    105554892 A    5/2016
(Continued)

OTHER PUBLICATIONS

Ni Jiqing et al.,"A Framework of 5G Air Interface: Software Defined Air Interface",ZTE Technology Journal, Jun. 2016 vol. 22 No. 3,total 5 pages.
(Continued)

*Primary Examiner* — Abdelnabi O Musa
(74) *Attorney, Agent, or Firm* — Huawei Technologies Co., Ltd.

(57) ABSTRACT

The application relates to allocating transmission resources in communication networks that provide low latency services. A terminal receives, from a base station time-frequency resource division information, which indicates a division of a time-frequency resource that is allowed to be used by another service. The division of the time-frequency resource includes one or more resource units in time domain and one or more resource units in frequency domain. The terminal further receives from the base station time-frequency resource indication information, which indicates that, in the time-frequency resource that is allowed to be used by the other service, at least one time domain resource unit and at least one frequency domain resource unit are occupied by the other service. The terminal communicates with the base station using the time-frequency resource except the at least one time-domain resource unit and at least (Continued)

one frequency-domain resource unit that are occupied by the other service.

16 Claims, 8 Drawing Sheets

(51) Int. Cl.
*H04W 72/10* (2009.01)
*H04W 72/12* (2009.01)

(56) References Cited

U.S. PATENT DOCUMENTS

| | | | |
|---|---|---|---|
| 2010/0034303 | A1 | 2/2010 | Damnjanovic et al. |
| 2011/0038345 | A1* | 2/2011 | Liu .................. H04W 72/0413 370/330 |
| 2014/0198776 | A1 | 7/2014 | Nammi |
| 2015/0188650 | A1* | 7/2015 | Au ..................... H04W 72/042 370/312 |
| 2015/0333898 | A1 | 11/2015 | Ji et al. |
| 2015/0334685 | A1 | 11/2015 | Ji et al. |
| 2016/0113008 | A1 | 4/2016 | Damnjanovic et al. |
| 2016/0119948 | A1* | 4/2016 | Damnjanovic ....... H04L 5/0044 370/280 |

FOREIGN PATENT DOCUMENTS

| | | |
|---|---|---|
| RU | 2479135 C2 | 4/2013 |
| RU | 2485703 C2 | 6/2013 |
| WO | 2015179135 A1 | 11/2015 |
| WO | 2016036492 A1 | 3/2016 |
| WO | 2016048595 A1 | 3/2016 |

OTHER PUBLICATIONS

R1-163322 Ericsson,"Downlink control signaling design for short TTI",3GPP TSG RAN WG1 Meeting #84bis,Busan, Apr. 11-15, 2016,total 4 pages.

Qualcomm Incorporated:"UL Channel Design for Shortened TTI", 3GPP Draft; R1-163069, vol. RAN WG1, No. Busan, Korea; Apr. 2, 2016, XP051080513, 8 pages.

Intel Corporation:"On multiplexing of PDSCH with different TTIs and related enhancements", 3GPP Draft; R1-163210, vol. RAN WG1, No. Busan, Korea; Apr. 2, 2016, XP051080593, 3 pages.

Samsung:"Discussion on Study Areas for URLLC in 5G New Radio Interface", 3GPP Draft; R2-162227, vol. RAN WG2, No. Dubrovnik, Croatia; Apr. 1, 2016, XP051082014, 4 pages.

* cited by examiner

ALLOCATING TRANSMISSION RESOURCES IN COMMUNICATION NETWORKS THAT PROVIDE LOW LATENCY SERVICES

CROSS-REFERENCE TO RELATED APPLICATIONS

This application is a continuation of International Application No. PCT/CN2016/081852, filed on May 12, 2016, the disclosure of which is hereby incorporated by reference in its entirety.

TECHNICAL FIELD

The present disclosure relates to the field of communication technologies, and in particular, to a resource indication method and a related device and system.

BACKGROUND

The International Telecommunication Union (ITU) defines three types of services in expectations and requirements of the fifth Generation (5G) wireless communication systems: enhanced mobile broadband (eMBB), ultra-reliable and low latency communications (URLLC), and massive machine type communications (mMTC), as shown in FIG. 1. URLLC services have an extremely strict requirement on latency. When there is a URLLC service, sufficient air interface resources need to be allocated to it, so as to correctly send service data in time. A currently-used air interface resource is a short transmission time interval (TTI), which includes a maximum of seven orthogonal frequency division multiple access (OFDMA) symbols. The short TTI is shorter than an 1 millisecond (ms) TTI. Therefore, latency can be reduced when the URLLC service is transmitted by using the short TTI. In the prior art, resource multiplexing problem of the short TTI and the 1 ms TTI is resolved through frequency division multiplexing (FDM), and, specifically, using a semi-persistent FDM manner or a dynamic FDM manner.

As shown in FIG. 2A, in the semi-persistent FDM manner, a base station divides system bandwidth into two parts. One part is for 1 ms TTI transmission, and another part is for short TTI transmission. The 1 ms TTI transmission and the short TTI transmission occupy a relatively fixed quantity of frequency domain resources. If a relatively large quantity of frequency domain resources are allocated for the short TTI transmission, but there are a relatively small quantity of resources required by the URLLC service, the frequency domain resources allocated for the short TTI transmission are wasted. If a relatively small quantity of frequency domain resources are allocated for short TTI transmission, but transmission of the URLLC service cannot be completed within the allocated short TTIs, the transmission latency of the URLLC service would be increased.

As shown in FIG. 2B, in the dynamic FDM manner, a base station dynamically allocates frequency domain resources for the short TTI transmission and the 1 ms TTI transmission on each of 1 ms time-frequency resources. If a URLLC service is remaining to be transmitted when a current subframe ends, more frequency domain resources would be allocated for the short TTI transmission in a next subframe. If no URLLC service is to be transmitted when the current subframe ends, fewer frequency domain resources would be allocated for the short TTI transmission in a next subframe. If more frequency domain resources are allocated for the short TTI transmission in a next subframe, but a relatively small quantity of the URLLC service need to be transmitted, frequency domain resources would be wasted. If fewer frequency domain resources are allocated for the short TTI transmission in a next subframe, but a relatively large quantity of the URLLC service need to be transmitted and the transmission cannot be completed within one short TTI, a transmission latency of the URLLC service would increase.

Therefore, in the above-mentioned semi-persistent FDM manner or the dynamic FDM manner, frequency domain resources might be wasted or transmission latency of the URLLC service might be too long no matter how the short TTI and the 1 ms TTI are multiplexed.

SUMMARY

Embodiments of the present disclosure disclose a resource indication method and a related device and system, to improve time-frequency resource utilization and ensure timely processing of a short-latency service.

A first aspect of the embodiments of the present disclosure discloses a resource indication method, and the method includes:

sending, by a base station, time-frequency resource indication information to a first terminal, where the time-frequency resource indication information is used to indicate that a first time-frequency resource has been allocated by the base station to a second terminal, a time domain of the first time-frequency resource is a part of a time domain of a second time-frequency resource, and the second time-frequency resource is a time-frequency resource allocated by the base station to the first terminal for data transmission; and performing, by the base station, data transmission with the first terminal by using a time-frequency resource that is in the second time-frequency resource and that does not overlap the first time-frequency resource.

In the foregoing steps, after the base station allocates the second time-frequency resource to the first terminal, if the base station allocates the first time-frequency resource to the second terminal according to a short-latency service requirement, and the first time-frequency resource and the second time-frequency resource overlap, the first terminal performs data transmission by using the time-frequency resource that is in the second time-frequency resource and that does not overlap the first time-frequency resource, so that not only time-frequency resource utilization is improved, but also timely processing of a short-latency service is ensured.

With reference to the first aspect, in a first possible implementation of the first aspect, the sending, by a base station, time-frequency resource indication information to a first terminal includes:

sending the time-frequency resource indication information to the first terminal on a control channel in a $k^{th}$ subframe, where the time domain of the first time-frequency resource is in a $(k-u)^{th}$ subframe, both k and u are positive integers, and k>u.

With reference to the first aspect, in a second possible implementation of the first aspect, the time domain of the first time-frequency resource is equal to an $m^{th}$ preset transmission time unit, and the sending, by a base station, time-frequency resource indication information to a first terminal includes:

sending the time-frequency resource indication information to the first terminal on a control channel of an $n^{th}$ preset transmission time unit, where both m and n are positive integers, and m<n.

With reference to the second possible implementation of the first aspect, in a third possible implementation of the first aspect, the time-frequency resource indication information is used to indicate that the first time-frequency resource has been allocated by the base station to the second terminal, and that a third time-frequency resource has been allocated to another terminal, where a time domain of the third time-frequency resource is equal to a $t^{th}$ preset transmission time unit, t is a positive integer, t<n, and t is not equal to m.

With reference to the first aspect, in a fourth possible implementation of the first aspect, the time domain of the first time-frequency resource is equal to an $m^{th}$ preset transmission time unit, and the sending, by a base station, time-frequency resource indication information to a first terminal includes:

sending the time-frequency resource indication information to the first terminal on a control channel of the $m^{th}$ preset transmission time unit, where m is a positive integer.

With reference to any one of the first aspect, or the first to the fourth possible implementations of the first aspect, in a fifth possible implementation of the first aspect, before the sending, by a base station, time-frequency resource indication information to a first terminal, the method further includes:

sending, by the base station, time-frequency resource division information to the first terminal, where the time-frequency resource division information is used to indicate that the first time-frequency resource is a time-frequency resource in a preset time-frequency range, and the preset time-frequency range is part time-frequency resources in system bandwidth.

With reference to any one of the first aspect, or the first to the fourth possible implementations of the first aspect, in a sixth possible implementation of the first aspect, the sending, by a base station, time-frequency resource indication information to a first terminal includes:

sending the time-frequency resource indication information to a plurality of terminals, where the plurality of terminals include the first terminal.

According to a second aspect, an embodiment of the present disclosure provides a resource indication method, and the method includes:

receiving, by a first terminal, time-frequency resource indication information sent by a base station, where the time-frequency resource indication information is used to indicate that a first time-frequency resource has been allocated by the base station to a second terminal, a time domain of the first time-frequency resource is a part of a time domain of a second time-frequency resource, and the second time-frequency resource is a time-frequency resource allocated by the base station to the first terminal for data transmission; and performing, by the first terminal, data transmission with the base station by using a time-frequency resource that is in the second time-frequency resource and that does not overlap the first time-frequency resource.

In the foregoing steps, after the base station allocates the second time-frequency resource to the first terminal, if the base station allocates the first time-frequency resource to the second terminal according to a short-latency service requirement, and the first time-frequency resource and the second time-frequency resource overlap, the first terminal performs data transmission by using the time-frequency resource that is in the second time-frequency resource and that does not overlap the first time-frequency resource, so that not only time-frequency resource utilization is improved, but also timely processing of a short-latency service is ensured.

With reference to the second aspect, in a first possible implementation of the second aspect, the receiving, by a first terminal, time-frequency resource indication information sent by a base station includes:

receiving the time-frequency resource indication information sent by the base station on a control channel in a $k^{th}$ subframe, where the time domain of the first time-frequency resource is in a $(k-u)^{th}$ subframe, both k and u are positive integers, and k>u.

With reference to the second aspect, in a second possible implementation of the second aspect, the time domain of the first time-frequency resource is equal to an $m^{th}$ preset transmission time unit, and the receiving, by a first terminal, time-frequency resource indication information sent by a base station includes:

receiving the time-frequency resource indication information sent by the base station on a control channel of an $n^{th}$ preset transmission time unit, where both m and n are positive integers, and m<n.

With reference to the second possible implementation of the second aspect, in a third possible implementation of the second aspect, the time-frequency resource indication information is used to indicate that the first time-frequency resource has been allocated by the base station to the second terminal, and that a third time-frequency resource has been allocated to another terminal, where a time domain of the third time-frequency resource is equal to a $t^{th}$ preset transmission time unit, t is a positive integer, t<n, and t is not equal to m.

With reference to the first possible implementation of the second aspect, in a fourth possible implementation of the second aspect, the time domain of the first time-frequency resource is equal to an $m^{th}$ preset transmission time unit, and the receiving, by a first terminal, time-frequency resource indication information sent by a base station includes:

receiving the time-frequency resource indication information sent by the base station on a control channel of the $m^{th}$ preset transmission time unit, where m is a positive integer.

With reference to any one of the second aspect, or the first to the fourth possible implementations of the second aspect, in a fifth possible implementation of the second aspect, before the receiving, by a first terminal, time-frequency resource indication information sent by a base station, the method further includes:

receiving, by the first terminal, time-frequency resource division information sent by the base station, where the time-frequency resource division information is used to indicate that the first time-frequency resource is a time-frequency resource in a preset time-frequency range, and the preset time-frequency range is part time-frequency resources in system bandwidth.

According to a third aspect, an embodiment of the present disclosure provides a base station, and the base station includes a processor, a memory, and a transceiver.

The memory is configured to store data and a program.

The processor invokes the program in the memory to perform the following operations:

sending time-frequency resource indication information to a first terminal by using the transceiver, where the time-frequency resource indication information is used to indicate that a first time-frequency resource has been allocated by the base station to a second terminal, a time domain of the first time-frequency resource is a part of a time domain of a second time-frequency resource, and the second time-frequency resource is a time-frequency resource allocated by the base station to the first terminal for data transmission; and performing, by using the transceiver, data transmission with the first terminal by using a time-frequency resource that is in the second time-frequency resource and that does not overlap the first time-frequency resource.

In the foregoing operations, after the base station allocates the second time-frequency resource to the first terminal, if the base station allocates the first time-frequency resource to the second terminal according to a short-latency service requirement, and the first time-frequency resource and the second time-frequency resource overlap, the first terminal performs data transmission by using the time-frequency resource that is in the second time-frequency resource and that does not overlap the first time-frequency resource, so that not only time-frequency resource utilization is improved, but also timely processing of a short-latency service is ensured.

With reference to the third aspect, in a first possible implementation of the third aspect, that the processor sends the time-frequency resource indication information to the first terminal by using the transceiver is specifically:

sending the time-frequency resource indication information to the first terminal on a physical downlink control channel (PDCCH) in a $k^{th}$ subframe by using the transceiver, where the time domain of the first time-frequency resource is in a $(k-u)^{th}$ subframe, both k and u are positive integers, and k>u.

With reference to the third aspect, in a second possible implementation of the third aspect, the time domain of the first time-frequency resource is equal to an $m^{th}$ preset transmission time unit, and that the processor sends the time-frequency resource indication information to the first terminal by using the transceiver is specifically:

sending the time-frequency resource indication information to the first terminal on a control channel of an $n^{th}$ preset transmission time unit by using the transceiver, where both m and n are positive integers, and m<n.

With reference to the second possible implementation of the third aspect, in a third possible implementation of the third aspect, the time-frequency resource indication information is used to indicate that the first time-frequency resource has been allocated by the base station to the second terminal, and that a third time-frequency resource has been allocated to another terminal, where a time domain of the third time-frequency resource is equal to a $t^{th}$ preset transmission time unit, t is a positive integer, t<n, and t is not equal to m.

With reference to the third aspect, in a fourth possible implementation of the third aspect, the time domain of the first time-frequency resource is equal to an $m^{th}$ preset transmission time unit, and that the processor sends the time-frequency resource indication information to the first terminal by using the transceiver is specifically:

sending the time-frequency resource indication information to the first terminal on a control channel of the $m^{th}$ preset transmission time unit by using the transceiver, where m is a positive integer.

With reference to any one of the third aspect, or the first to the fourth possible implementations of the third aspect, in a fifth possible implementation of the third aspect, before sending the time-frequency resource indication information to the first terminal by using the transceiver, the processor is further configured to:

send time-frequency resource division information to the first terminal by using the transceiver, where the time-frequency resource division information is used to indicate that the first time-frequency resource is a time-frequency resource in a preset time-frequency range, and the preset time-frequency range is part time-frequency resources in system bandwidth.

With reference to any one of the third aspect, or the first to the fifth possible implementations of the third aspect, in a sixth possible implementation of the third aspect, that the processor sends the time-frequency resource indication information to the first terminal by using the transceiver is specifically:

sending the time-frequency resource indication information to a plurality of terminals by using the transceiver, where the plurality of terminals include the first terminal.

According to a fourth aspect, an embodiment of the present disclosure provides a first terminal, where the first terminal includes a processor, a memory, and a transceiver.

The memory is configured to store data and a program.

The processor invokes the program in the memory to perform the following operations:

receiving, by using the transceiver, time-frequency resource indication information sent by a base station, where the time-frequency resource indication information is used to indicate that a first time-frequency resource has been allocated by the base station to a second terminal, a time domain of the first time-frequency resource is a part of a time domain of a second time-frequency resource, and the second time-frequency resource is a time-frequency resource allocated by the base station to the first terminal for data transmission; and performing, by using the transceiver, data transmission with the base station by using a time-frequency resource that is in the second time-frequency resource and that does not overlap the first time-frequency resource.

In the foregoing operations, after the base station allocates the second time-frequency resource to the first terminal, if the base station allocates the first time-frequency resource to the second terminal according to a short-latency service requirement, and the first time-frequency resource and the second time-frequency resource overlap, the first terminal performs data transmission by using the time-frequency resource that is in the second time-frequency resource and that does not overlap the first time-frequency resource, so that not only time-frequency resource utilization is improved, but also timely processing of a short-latency service is ensured.

With reference to the fourth aspect, in a first possible implementation of the fourth aspect, that the processor receives, by using the transceiver, the time-frequency resource indication information sent by the base station is specifically:

receiving, by using the transceiver, the time-frequency resource indication information sent by the base station on a control channel in a $k^{th}$ subframe, where the time domain of the first time-frequency resource is in a $(k-u)^{th}$ subframe, both k and u are positive integers, and k>u.

With reference to the fourth aspect, in a second possible implementation of the fourth aspect, the time domain of the first time-frequency resource is equal to an $m^{th}$ preset transmission time unit, and that the processor receives, by using the transceiver, the time-frequency resource indication information sent by the base station is specifically:

receiving, by using the transceiver, the time-frequency resource indication information sent by the base station on a control channel of an $n^{th}$ preset transmission time unit, where both m and n are positive integers, and m<n.

With reference to the second possible implementation of the fourth aspect, in a third possible implementation of the fourth aspect, the time-frequency resource indication information is used to indicate that the first time-frequency resource has been allocated by the base station to the second terminal, and that a third time-frequency resource has been allocated to another terminal, where a time domain of the third time-frequency resource is equal to a $t^{th}$ preset transmission time unit, t is a positive integer, t<n, and t is not equal to m.

With reference to the fourth aspect, in a fourth possible implementation of the fourth aspect, the time domain of the first time-frequency resource is equal to an $m^{th}$ preset transmission time unit, and that the processor receives, by using the transceiver, the time-frequency resource indication information sent by the base station is specifically:

receiving, by using the transceiver, the time-frequency resource indication information sent by the base station on a control channel of the $m^{th}$ preset transmission time unit, where m is a positive integer.

With reference to any one of the fourth aspect, or the first to the fourth possible implementations of the fourth aspect, in a fifth possible implementation of the fourth aspect, before receiving, by using the transceiver, the time-frequency resource indication information sent by the base station, the processor is further configured to:

receive, by using the transceiver, time-frequency resource division information sent by the base station, where the time-frequency resource division information is used to indicate that the first time-frequency resource is a time-frequency resource in a preset time-frequency range, and the preset time-frequency range is part time-frequency resources in system bandwidth.

In some possible implementations of the first aspect, the second aspect, the third aspect, and the fourth aspect, the time-frequency resource division information is carried in a system information block (SIB).

In some possible implementations of the first aspect, the second aspect, the third aspect, and the fourth aspect, the time-frequency resource indication information is downlink control information (DCI), and the DCI includes a field indicating the first time-frequency resource.

In some possible implementations of the first aspect, the second aspect, the third aspect, and the fourth aspect, a length of the DCI is the same as a length of DCI in a format 1A or a length of DCI in a format 1C.

In some possible implementations of the first aspect, the second aspect, the third aspect, and the fourth aspect, when the length of the DCI is the same as the length of the DCI in the format 1A, a scrambling sequence of the DCI is different from a scrambling sequence of the DCI in the format 1A; or when the length of the DCI is the same as the length of the DCI in the format 1C, a scrambling sequence of the DCI is different from a scrambling sequence of the DCI in the format 1C.

According to a fifth aspect, an embodiment of the present disclosure provides a base station, and the base station includes a functional unit for performing some or all steps in any implementation of the first aspect.

According to a sixth aspect, an embodiment of the present disclosure provides a first terminal, and the first terminal includes a functional unit for performing some or all steps in any implementation of the second aspect.

According to a seventh aspect, an embodiment of the present disclosure provides a communications system, and the communications system includes a base station and a first terminal.

The base station is configured to send time-frequency resource indication information to the first terminal.

The first terminal is configured to receive the time-frequency resource indication information sent by the base station, where the time-frequency resource indication information is used to indicate that a first time-frequency resource has been allocated by the base station to a second terminal, a time domain of the first time-frequency resource is a part of a time domain of a second time-frequency resource, and the second time-frequency resource is a time-frequency resource allocated by the base station to the first terminal for data transmission.

The base station is further configured to perform data transmission with the first terminal by using a time-frequency resource that is in the second time-frequency resource and that does not overlap the first time-frequency resource.

With reference to the seventh aspect, in a first possible implementation of the seventh aspect, the base station is the base station described in any possible implementation of the third aspect, or the base station described in the fifth aspect, and the first terminal is the first terminal described in any possible implementation of the fourth aspect, or the first terminal described in the sixth aspect.

In conclusion, by implementing the embodiments of the present disclosure, after the base station allocates the second time-frequency resource to the first terminal, if the base station allocates the first time-frequency resource to the second terminal according to a short-latency service requirement, and the first time-frequency resource and the second time-frequency resource overlap, the first terminal performs data transmission by using the time-frequency resource that is in the second time-frequency resource and that does not overlap the first time-frequency resource, so that not only time-frequency resource utilization is improved, but also timely processing of a short-latency service is ensured.

DESCRIPTION OF EMBODIMENTS

The technical solutions in embodiments of the present disclosure are described in details below with reference to the accompanying drawings.

A terminal, as being referred to in the embodiments of the present disclosure, may be a handheld device, an in-vehicle device, a wearable device, a computing device that provides a radio communications function, a processing device connected to a wireless modem, or user equipment (UE) in various forms, including a mobile station (MS) and other terminal equipment. For ease of description, these devices are collectively referred to as a terminal in this application.

Figure 1:
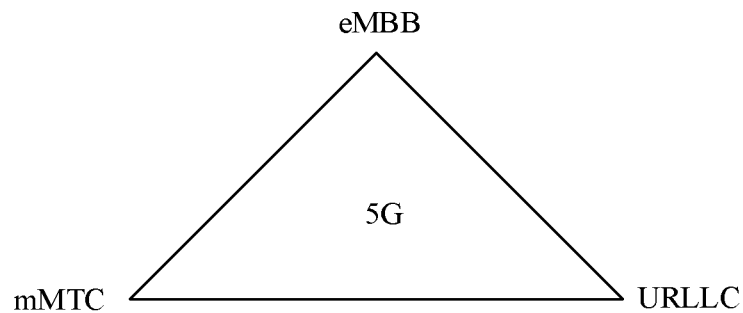
FIG. 1 is a schematic diagram of three expected major services in 5G technology.
Figure 2A:
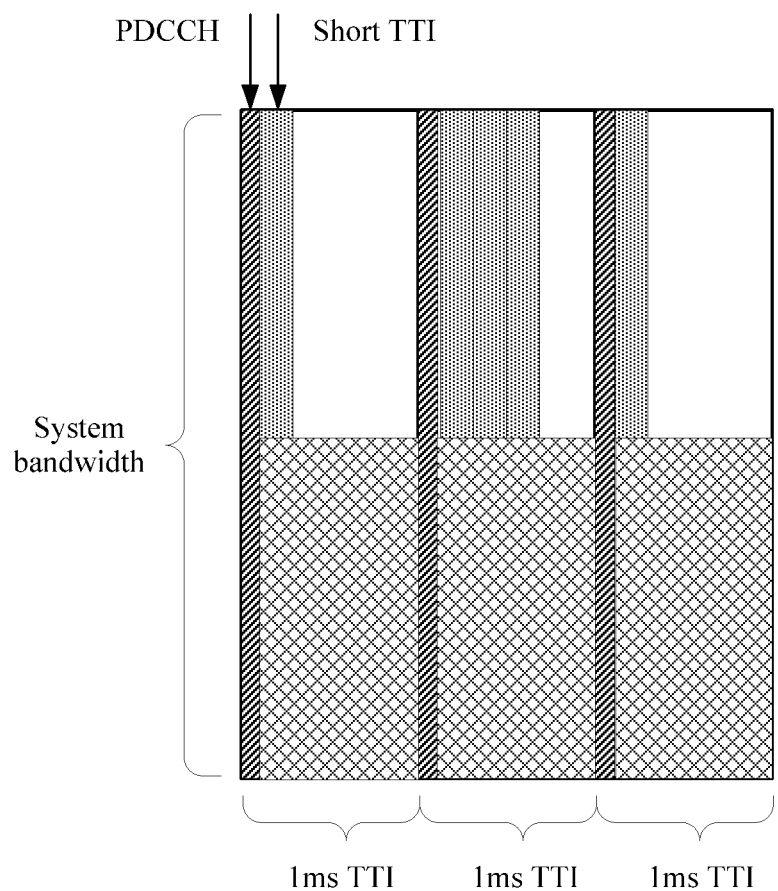
FIG. 2A is a schematic diagram of a manner of multiplexing short TTIs and 1 ms TTIs in the prior art.
Figure 2B:
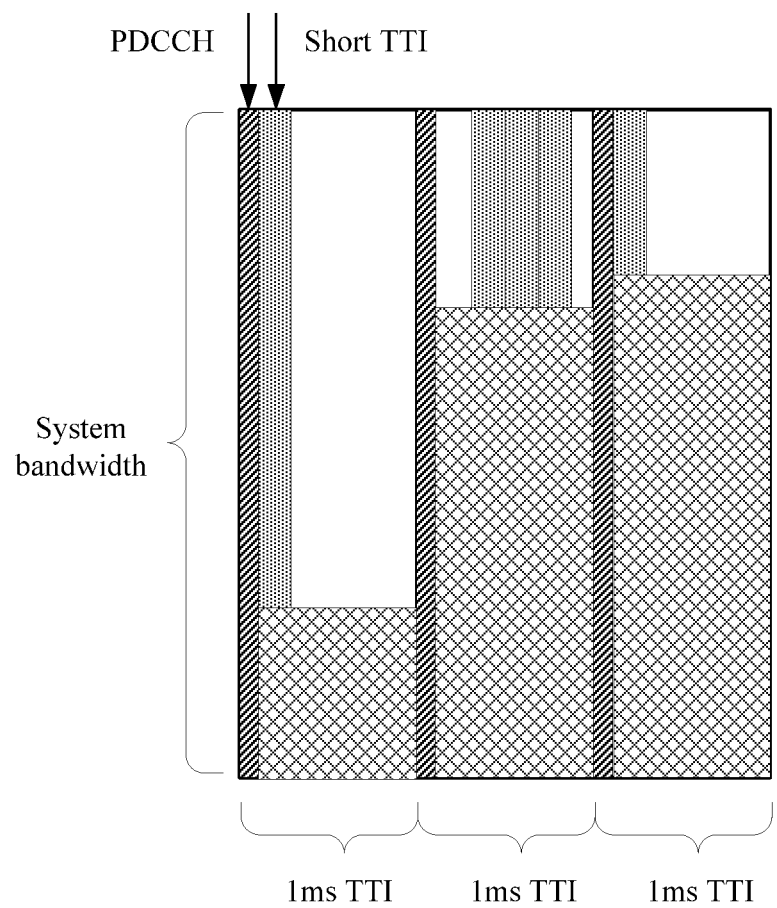
FIG. 2B is a schematic diagram of another manner of multiplexing short TTIs and 1 ms TTIs in the prior art.
Figure 3:
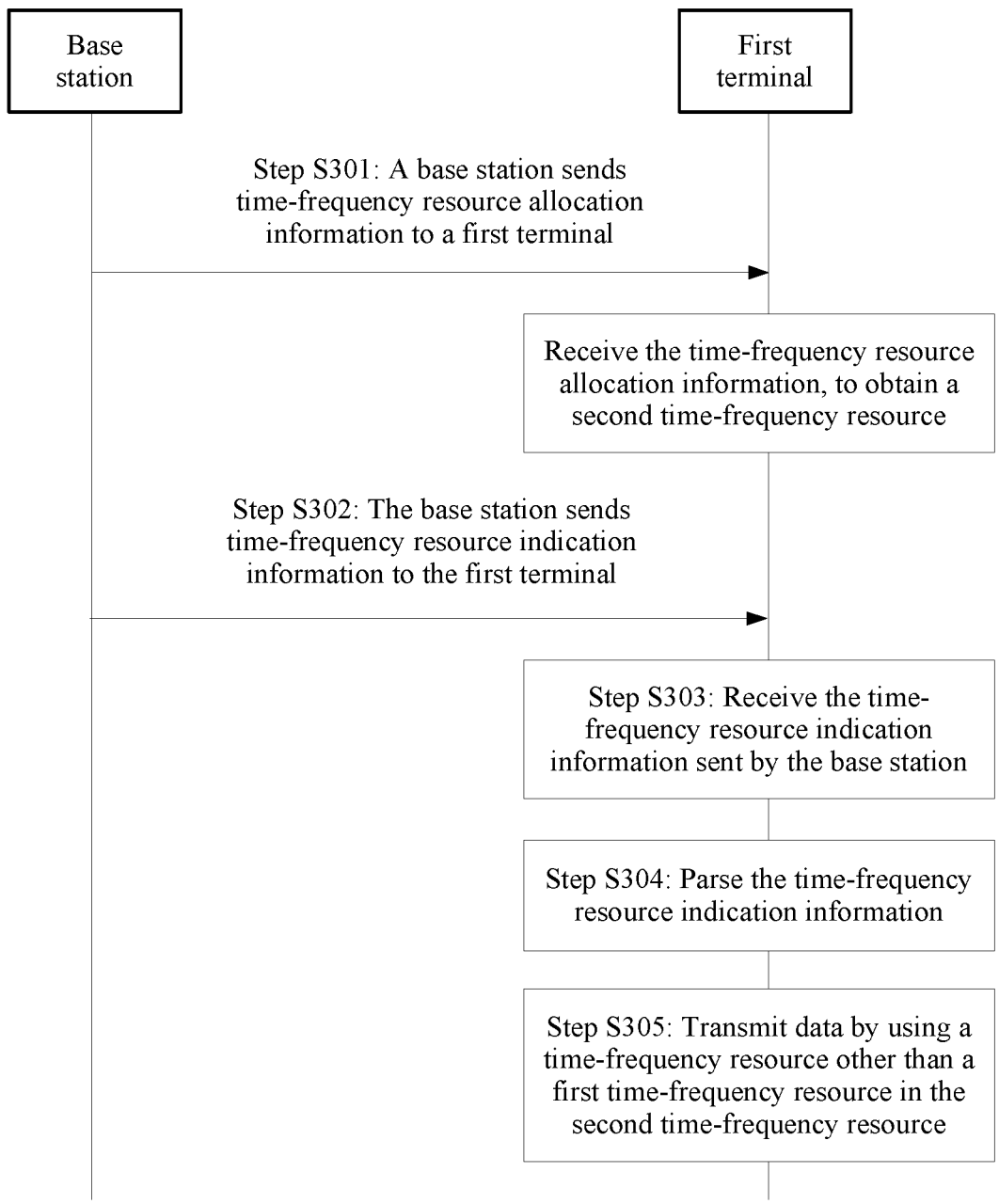
FIG. 3 is a flowchart of a resource indication method according to an embodiment of the present disclosure.

FIG. 3 shows a resource indication method according to an embodiment of the present disclosure. The method includes the following operations:

Step S301: A base station sends a time-frequency resource allocation message to a first terminal, indicating that a second time-frequency resource is allocated to the first terminal, for the first terminal to transmit data.

Step S302: The base station sends time-frequency resource indication information to the first terminal.

In an option, when a short-latency service (for example, a URLLC service) needs to be transmitted between the base station and different terminal other than the first terminal (referred to as a second terminal), the base station timely allocates a first time-frequency resource with a relatively short transmission time interval (TTI) to the second terminal. Data transmission latency can be reduced by using the time-frequency resource with a relatively short TTI. The TTI of the first time-frequency resource is shorter than a TTI of the second time-frequency resource allocated to the first terminal. Therefore, it is possible that a time domain of the first time-frequency resource is a part of a time domain of the second time-frequency resource (i.e. the first time-frequency resource and the second time-frequency resource may overlap in the time domain). When the time domain of the first time-frequency resource is a part of the time domain of the second time-frequency resource, to avoid the first terminal and the second terminal using a same time-frequency resource, the base station needs to send the time-frequency resource indication information to the first terminal. The time-frequency resource indication information indicates to the first terminal that the first time-frequency resource (e.g. short TTI) has been allocated to the second terminal, so that the first terminal adjusts its strategy of using the second time-frequency resource (e.g. long TTI).

Optionally, the base station may send the time-frequency resource indication information through broadcasting. Usually, a plurality of terminals (including the first terminal) may receive the time-frequency resource indication information.

Figure 4:
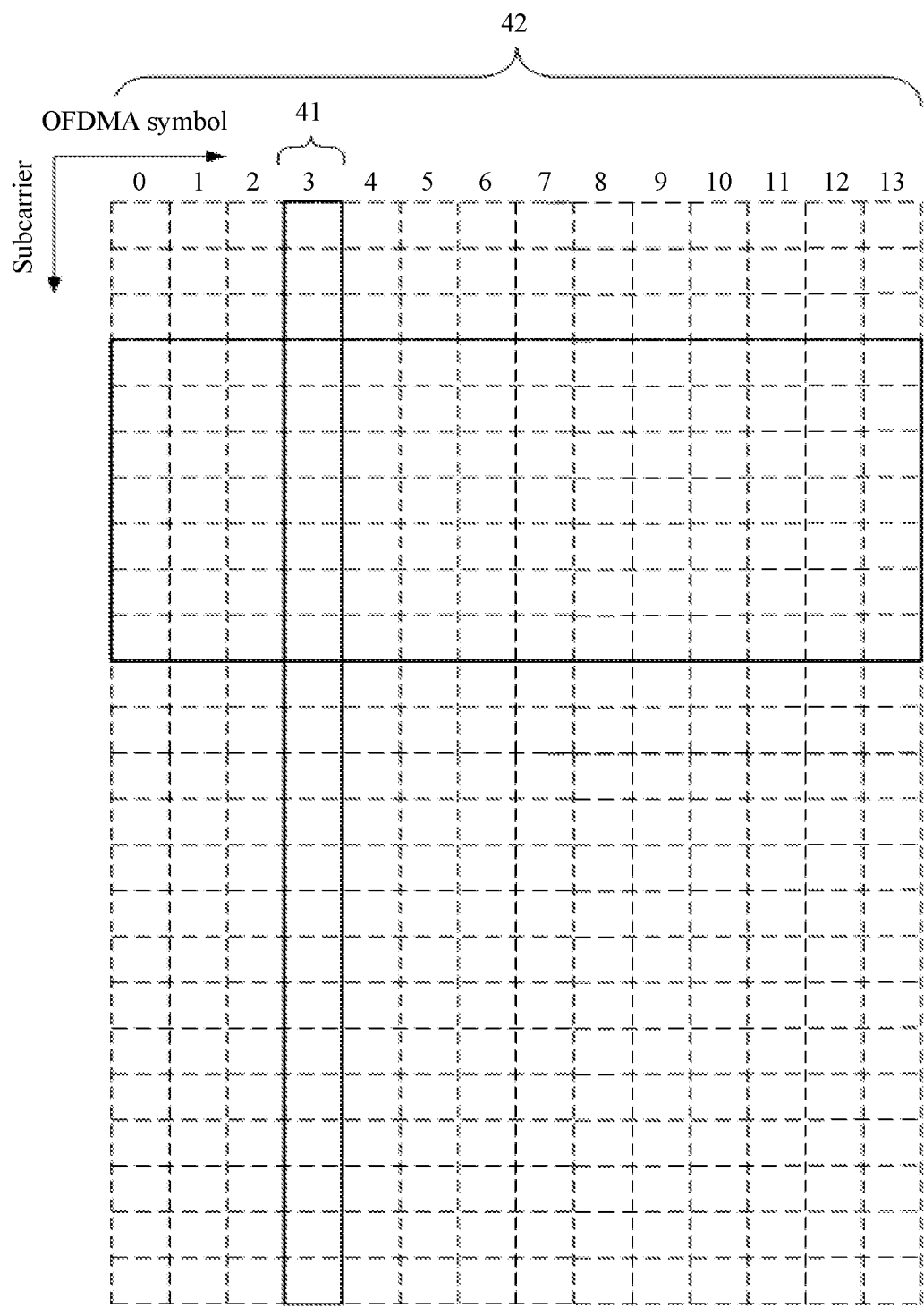
FIG. 4 is a schematic diagram of time domain lengths of a short TTI and a 1 ms TTI according to an embodiment of the present disclosure.

An example of the relationship between the TTI of the first time-frequency resource (e.g. short TTI) and the TTI of the second time-frequency resource (e.g. long TTI) is shown in FIG. 4. The TTI of the first time-frequency resource may be a time domain length of an OFDMA symbol 41, or a time domain length of some consecutive OFDMA symbols. For ease of differentiation, the TTI of the first time-frequency resource may be referred to as a short Transmission Time Interval (sTTI). The TTI of the second time-frequency resource is a time domain length 42 (usually a length of one subframe) including all OFDMA symbols shown in FIG. 4.

In the prior art, usually a next subframe starts only when a current subframe ends. Therefore, two time-frequency resources do not overlap. In the embodiments of the present disclosure, however, because there are two TTI lengths, the time domain of a first time-frequency resource may be a part of the time domain of a second time-frequency resource.

In an optional solution, the base station sends the time-frequency resource indication information to the first terminal on a control channel in a $k^{th}$ subframe, where the time domain of the first time-frequency resource is in a $(k-u)^{th}$ subframe, both k and u are positive integers, and k>u.

For example, there are a plurality of consecutive subframes in the time domain. A time sequence of the subframes is represented by a first subframe, a second subframe, a third subframe, etc. The first subframe, the second subframe, the third subframe, etc. are consecutive and do not overlap in time domain. A transmission time interval of the first time-frequency resource is less than a length of one subframe. In other words, the time domain of the first time-frequency resource falls within a subframe, and this subframe is the $(k-u)^{th}$ subframe. The base station specifically sends the time-frequency resource indication information to the first terminal on the control channel corresponding to the $k^{th}$ subframe. For example, if u is 1, the base station always sends the resource indication information on a physical downlink control channel (PDCCH) corresponding to a next subframe, to indicate that a first time-frequency resource in a current subframe is preempted. What means "preempt" is that, for example, when the second time-frequency resource (e.g. long TTI) allocated by the base station to the first terminal includes the first time-frequency resource (e.g. short TTI), and the first time-frequency resource has been allocated to another terminal before the first terminal uses up the second time-frequency resource, for the first terminal, the time domain occupied by first time-frequency resource within the second time-frequency resource is preempted.

Corresponding to the sTTI, there is a time domain resource whose time length equals to the sTTI. The time domain resource, whose time length equals to the sTTI, may be referred to as a preset time domain. For differentiation in a time sequence, preset time domains may be sequentially referred to as a first preset time domain, a second preset time domain, a third preset time domain, etc. (the time domain resources in the prior art, whose time length equals to the 1 ms TTI, are usually referred to as a first subframe, a second subframe, a third subframe, etc. and for the preset time domain in the embodiments of the present disclosure, refer to a principle of the subframe). Similar to the prior art in which each subframe corresponds to a PDCCH, each preset time domain corresponds to a control channel in the embodiments of the present disclosure. It is assumed that the time domain of the first time-frequency resource equals to an $m^{th}$ preset time domain. That the base station sends the time-frequency resource indication information to the first terminal is specifically: The base station sends the time-frequency resource indication information to the first terminal on a control channel of an $n^{th}$ preset time domain, where both m and n are positive integers, and m<n.

To be specific, the base station sends the time-frequency resource indication information in the $n^{th}$ preset time domain, to indicate that a first time-frequency resource in the $m^{th}$ preset time domain is preempted. The $n^{th}$ preset time domain is a preset time domain before the $m^{th}$ preset time domain. Optionally, the time-frequency resource indication information not only can indicate that the first time-frequency resource in the $m^{th}$ preset time domain is preempted, but also can indicate that a third time-frequency resource in a $t^{th}$ preset time domain is preempted. The $t^{th}$ preset time domain is a preset time domain before the $m^{th}$ preset time domain, and t is not equal to m. Further, the time-frequency resource indication information can also indicate that time-frequency resources in other more preset time domains are preempted, provided that the other preset time domains are before the $n^{th}$ preset time domain.

In another optional solution, the time domain of the first time-frequency resource equals to an $m^{th}$ preset time domain. That the base station sends the time-frequency resource indication information to the first terminal is specifically: The base station sends the time-frequency resource indication information to the first terminal on a control channel of the $m^{th}$ preset time domain. In other words, the base station sends the time-frequency resource indication information on the control channel of the $m^{th}$ preset time domain, to indicate that the first time-frequency resource is preempted.

That the time-frequency resource indication information indicates that the first time-frequency resource is preempted may include two aspects. In a first aspect, the time-frequency resource indication information indicates that a time-frequency resource is preempted. In a second aspect, the time-frequency resource indication information indicates that the time-frequency resource includes the first time-frequency resource. In the following descriptions, first, how to indicate that a time-frequency resource is preempted is described, and then how to indicate that the time-frequency resource includes the first time-frequency resource is described.

In the first aspect, the time-frequency resource indication information is downlink control information (DCI). In the embodiments of the present disclosure, the DCI is configured to be different from DCI in any existing format in the prior art, so as to indicate that the DCI is used to indicate that a time-frequency resource is preempted.

In an optional solution, a length of the DCI is set to be different from lengths of DCI in various existing formats in the prior art, to reflect that the DCI indicates that a time-frequency resource is preempted.

In another optional solution, a length of the DCI may be the same as a length of DCI in a format 1A or a length of DCI in a format 1C. When the length of the DCI is the same as that of the DCI in the format 1A or 1C, in a related communications protocol, a new blind detection mechanism does not need to be configured particularly for the DCI, and only a blind detection mechanism corresponding to the DCI in the format 1A or 1C is directly used. Further, when the length of the DCI is the same as the length of the DCI in the format 1A, a scrambling sequence of the DCI may be different from a scrambling sequence of the DCI in the format 1A. When the length of the DCI is the same as the length of the DCI in the format 1C, a scrambling sequence of the DCI may be different from a scrambling sequence of the DCI in the format 1C. The reason for such a setting that when the length of the DCI is the same as the length of the DCI in the format 1A, the DCI and the DCI in the format 1A or 1C may be distinguished by using scrambling sequences of different types.

In the second aspect, the DCI may include a field that indicates the first time-frequency resource. In one option, a time domain field is set to represent the time domain corresponding to the first time-frequency resource, and a frequency domain of the first time-frequency resource is predefined in a communications protocol. In another option, a frequency domain field is set to represent a frequency domain corresponding to the first time-frequency resource, and the time domain of the first time-frequency resource is predefined in a communications protocol. In yet another option a frequency domain field and a time domain field are set to respectively represent a frequency domain and the time domain corresponding to the first time-frequency resource. In still another option, one field is set to represent a combination of the time domain and a frequency domain of the first time-frequency resource.

Optionally, when a frequency domain field and a time domain field are set to respectively represent the frequency domain and the time domain corresponding to the first time-frequency resource, the time domain field may have P bits respectively corresponding to P preset time domains, and the frequency domain field has Q bits respectively corresponding to Q preset frequency domains. A time-frequency resource including a time domain, corresponding to a bit with a value that equals to a first reference value, in the P bits and a frequency domain, corresponding to a bit with a value that equals to a second reference value, in the Q bits is the first time-frequency resource, and both P and Q are positive integers.

Figure 5:
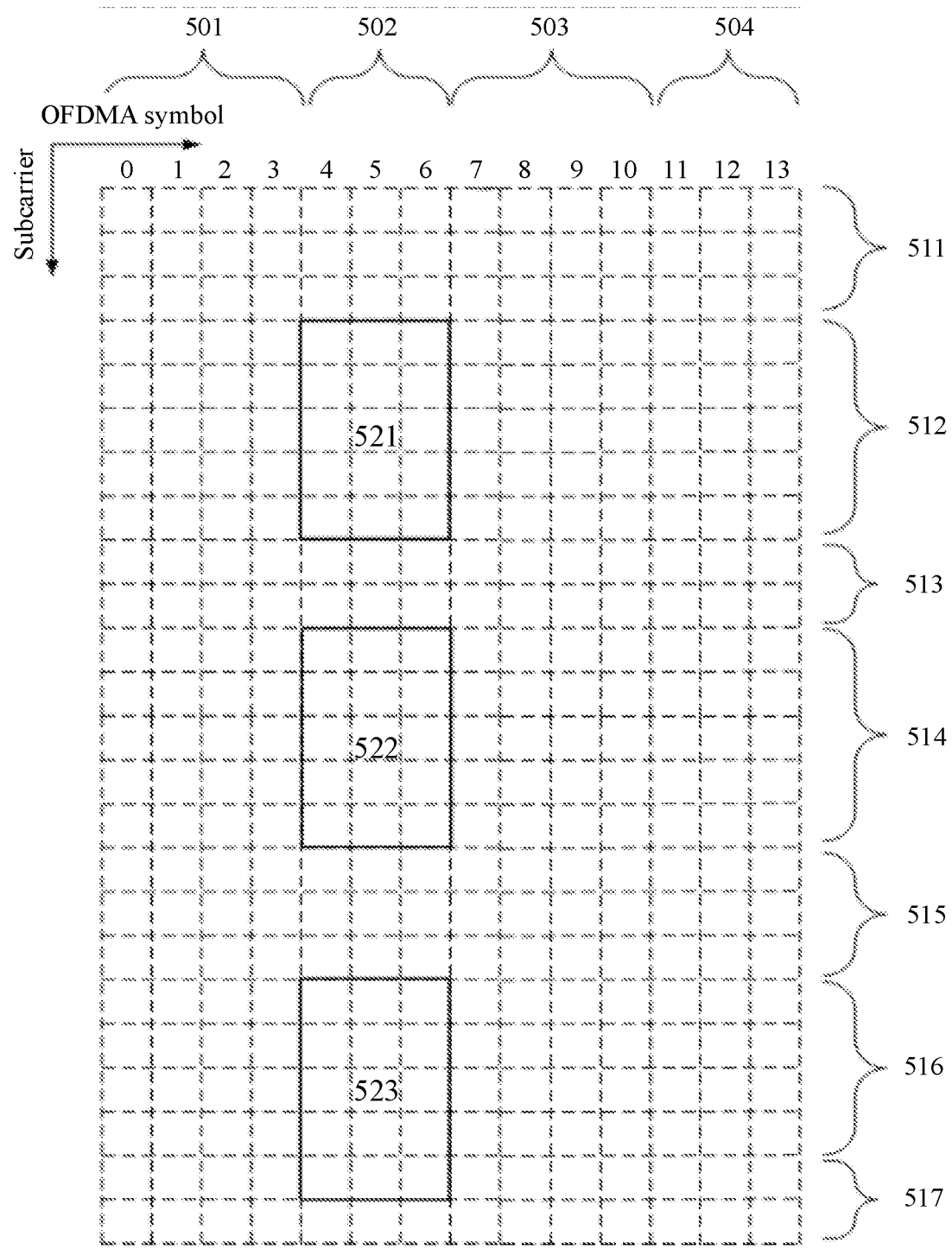
FIG. 5 is a schematic diagram of a scenario of P time domains and Q frequency domains according to an embodiment of the present disclosure.

Division of the P time domains and the Q frequency domains includes but is not limited to the following two cases:

Case 1: The P preset time domains and the Q preset frequency domains are obtained by dividing system bandwidth. Shown in FIG. 5 is an example. A time domain in system bandwidth 50 is divided into four time domain units: a time domain unit 501, a time domain unit 502, a time domain unit 503, and a time domain unit 504. A frequency domain in the system bandwidth is divided into seven frequency domain units: a frequency domain unit 511, a frequency domain unit 512, a frequency domain unit 513, a frequency domain unit 514, a frequency domain unit 515, a frequency domain unit 516, and a frequency domain unit 517. A time domain field may include four bits respectively corresponding to the time domain unit 501, the time domain unit 502, the time domain unit 503, and the time domain unit 504. A frequency domain field may include seven bits respectively corresponding to the frequency domain unit 511, the frequency domain unit 512, the frequency domain unit 513, the frequency domain unit 514, the frequency domain unit 515, the frequency domain unit 516, and the frequency domain unit 517. It is assumed that both the first reference value and the second reference value are 1. If the time domain field is 0100, and the frequency domain field is 0101010, it indicates that a time-frequency resource in an area 521, a time-frequency resource in an area 522, and a time-frequency resource in an area 523 are preempted. This indication manner may be used to indicate the preempted first time-frequency resource.

Figure 6:
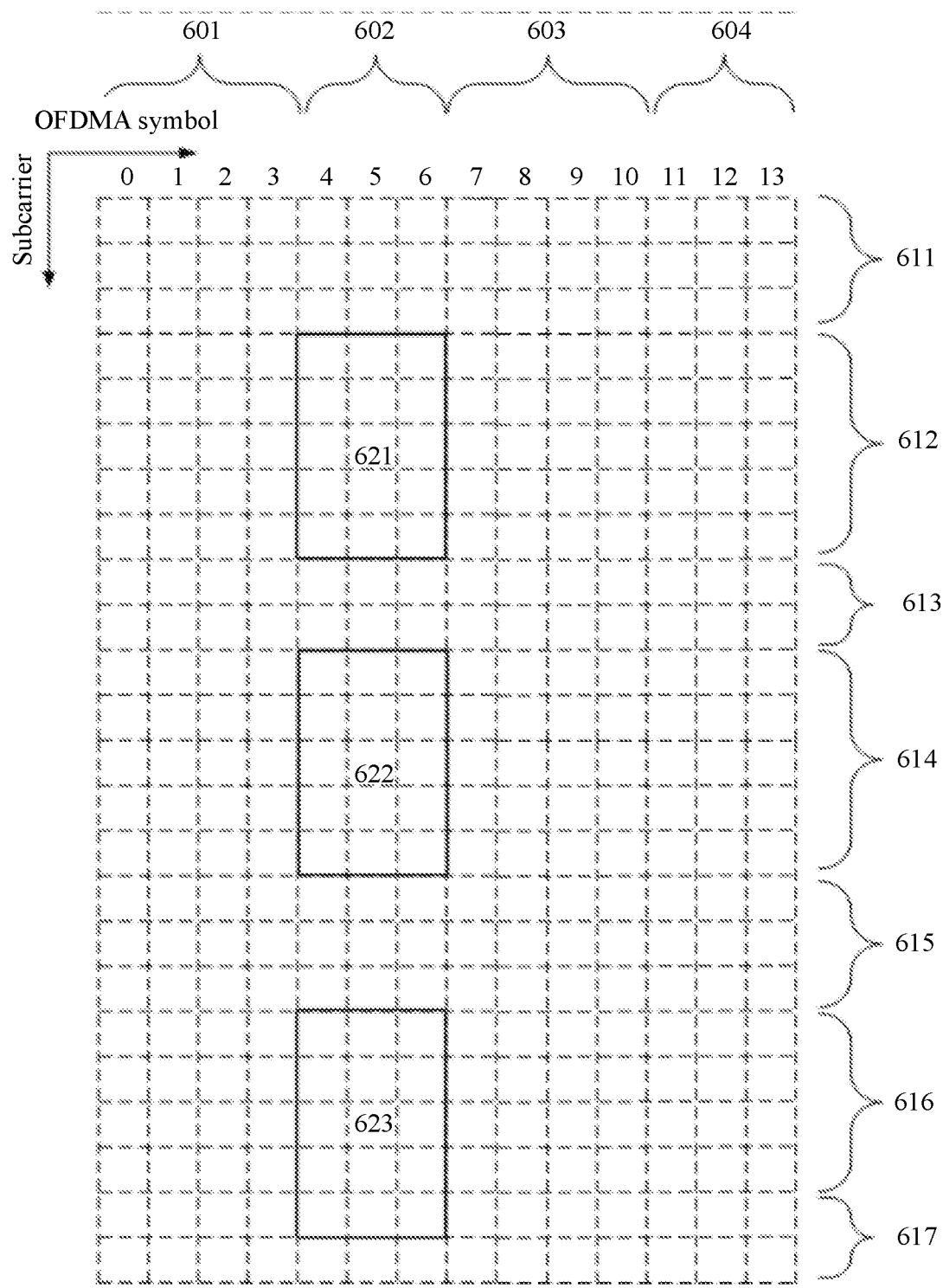
FIG. 6 is a schematic diagram of another scenario of P time domains and Q frequency domains according to an embodiment of the present disclosure.

Case 2: The P preset time domains and the Q preset frequency domains are obtained by dividing a preset time-frequency range. The preset time-frequency range is an area that is obtained by dividing system bandwidth and that includes time-frequency resources that can be preempted. Shown in FIG. 6 is an example. A time domain in system bandwidth 60 is divided into four time domain units: a time domain unit 601, a time domain unit 602, a time domain unit 603, and a time domain unit 604. A frequency domain in the system bandwidth is divided into seven frequency domain units: a frequency domain unit 611, a frequency domain unit 612, a frequency domain unit 613, a frequency domain unit 614, a frequency domain unit 615, a frequency domain unit 616, and a frequency domain unit 617. Time-frequency resources that can be preempted may be indicated by sending time-frequency resource division information to the first terminal. The time-frequency resource division information may include a time domain field and a frequency domain field. The time domain field may include four bits respectively corresponding to the time domain unit 601, the time domain unit 602, the time domain unit 603, and the time domain unit 604. The frequency domain field may include seven bits respectively corresponding to the frequency domain unit 611, the frequency domain unit 612, the frequency domain unit 613, the frequency domain unit 614, the frequency domain unit 615, the frequency domain unit 616, and the frequency domain unit 617. It is assumed that both the first reference value and the second reference value are 1. When the time-frequency resource division information includes a time domain field 0110 and a frequency domain field 0101010, a time-frequency resource (621, 622, 623) including the time domain unit 602, the time domain unit 603, the frequency domain unit 612, the frequency domain unit 614, and the frequency domain unit 616 is the preset time-frequency range.

After a time-frequency resource that can be preempted is indicated by using the time domain field 0110 and the frequency domain field 0101010, a time domain field in subsequently sent time-frequency resource indication information needs to include only two bits respectively corresponding to the time domain unit 602 and the time domain unit 603. A frequency domain field of the time-frequency resource indication information needs to include only three bits respectively corresponding to the frequency domain unit 612, the frequency domain unit 614, and the frequency domain unit 616.

In other words, before sending the time-frequency resource indication information to the first terminal, the base station first needs to send the time-frequency resource division information to the first terminal. A time-frequency resource that may be subsequently used as the first time-frequency resource is limited to a specific range by using the time-frequency resource division information. When it is subsequently indicated, by using the time-frequency resource indication information, that the first time-frequency resource is preempted, the first time-frequency resource only needs to be indicated in the limited range. Usually, the base station may subsequently send time-frequency resource indication information to the first terminal for a plurality of times. The first time-frequency resource may be determined, by using the time-frequency resource indication information sent for the plurality of times, based on a limited range in time-frequency resource division information sent once. The time-frequency resource division information may be a cell-level message, for example, a system information block (SIB). In comparison with that in case 1, the time-frequency resource indication information includes a smaller quantity of bits in case 2, thereby reducing overheads.

Optionally, when a frequency domain field is set to represent the frequency domain corresponding to the first time-frequency resource, and the time domain of the first time-frequency resource is predefined in the communications protocol, it may be predefined in the communications protocol that a time domain used by the base station to send the time-frequency resource indication information equals to the time domain of the first time-frequency resource. When determining that the first time-frequency resource is preempted, the base station sends the time-frequency resource indication information in the time domain of the first time-frequency resource. Correspondingly, the first terminal may also parse a time domain resource used by the base station to send the first time-frequency resource. Further, for a manner in which the time-frequency resource indication information indicates the frequency domain of the first time-frequency resource by using the frequency domain field, refer to case 1 and case 2 described above. Certainly, the manner is not limited to the two cases.

It should be noted that the time domain unit may be an OFDMA symbol, a symbol group including a plurality of consecutive OFDMA symbols, or the like. The frequency domain unit may be a subcarrier, a frequency domain length of a resource block group (RBG), or a frequency domain length of an RBG group including a plurality of consecutive RBGs.

Step S303: The first terminal receives the time-frequency resource indication information from the base station (refer back to FIG. 3).

In an optional solution, the first terminal receives the time-frequency resource indication information on a PDCCH of each subframe. In another optional solution, the first terminal receives the time-frequency resource indication information on a preconfigured control channel of the sTTI.

In another optional solution, before receiving the time-frequency resource indication information, the first terminal receives time-frequency resource division information from the base station. The time-frequency resource division information received by the first terminal may be carried in the SIB. After receiving the time-frequency resource division information, the base station parses the time-frequency resource division information, and obtains, through analysis, a time-frequency resource range indicated in the time-frequency resource division information. The indicated time-frequency resource range is the preset time-frequency range.

Step S304: The first terminal parses the time-frequency resource indication information.

Specifically, the first terminal obtains, through parsing, a time-frequency resource indicated in the time-frequency resource indication information. The indicated time-frequency resource is the first time-frequency resource, namely, the preempted time-frequency resource. In an optional solution, the first terminal may descramble received DCI. When a descrambling sequence for descrambling the received DCI is a preset descrambling sequence that is specially used to descramble the time-frequency resource indication information, it indicates that the received DCI is the time-frequency resource indication information. Further, if it is preset that a length of the DCI is the same as the length of the DCI in the format 1A, the first terminal may use a same blind detection policy for the DCI and the DCI in the format 1A. Alternatively, if it is preset that a length of the DCI is the same as the length of the DCI in the format 1C, the first terminal may use a same blind detection policy for the DCI and the DCI in the format 1C.

In an optional solution, the first terminal pre-stores system bandwidth division information, for example, the information shown in FIG. 5 and FIG. 6. The first terminal obtains, through parsing, bits included in the time domain field and the frequency domain field in the time-frequency resource indication information, and then determines the indicated time-frequency resource based on a correspondence between each bit and the time domain and a correspondence between each bit and the frequency domain.

Step S305: The first terminal transmits data by using a time-frequency resource, other than the first time-frequency resource, in the second time-frequency resource.

Specifically, after the first terminal determines the first time-frequency resource, because the base station allocates the second time-frequency resource to the first terminal before the first terminal receives the time-frequency resource indication information, and the first time-frequency resource and the second time-frequency resource overlap, to avoid a conflict of using the time-frequency resource, the first terminal transmits data by using a time-frequency resource that is in the second time-frequency resource and that does not overlap the first time-frequency resource.

In the method shown in FIG. 3, after the base station allocates the second time-frequency resource to the first terminal, if the base station allocates the first time-frequency resource to the second terminal according to a short-latency service requirement, and the first time-frequency resource and the second time-frequency resource overlap, the first terminal performs data transmission by using the time-frequency resource that is in the second time-frequency resource and that does not overlap the first time-frequency resource. Therefore, not only time-frequency resource utilization is improved, but also timely processing of a short-latency service is ensured.

The method in the embodiments of the present disclosure is described in detail above. To help better implement the foregoing solution in the embodiments of the present disclosure, an apparatus is correspondingly provided below.

Figure 7:
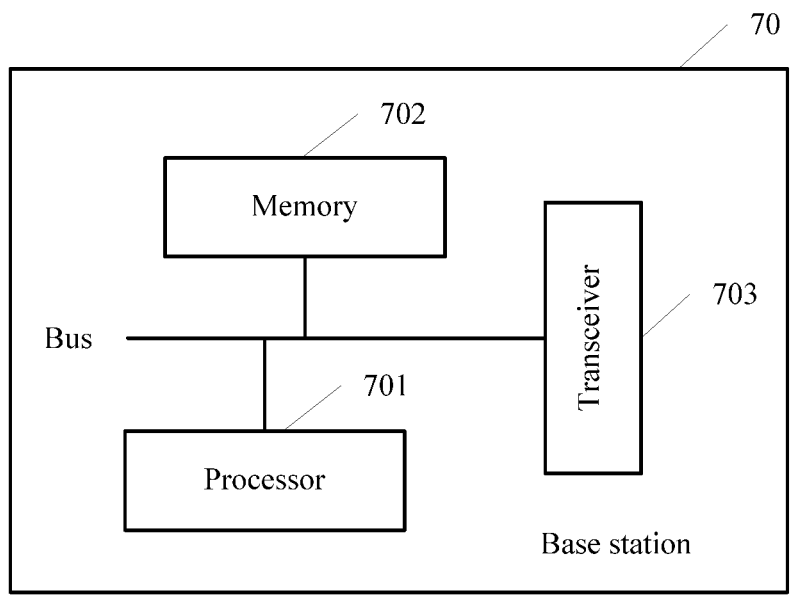
FIG. 7 is a schematic block diagram of a base station according to an embodiment of the present disclosure.

FIG. 7 shows a base station 70 according to an embodiment of the present disclosure. The base station 70 includes a processor 701 (there may be one or more processors 701, and one processor is used as an example in FIG. 7), a memory 702, and a transceiver 703. In some embodiments of the present disclosure, the processor 701, the memory 702, and the transceiver 703 may be connected by using a bus or in another manner. In FIG. 7, a bus connection is used as an example.

The memory 702 is configured to store data and a program.

The processor 701 invokes the program in the memory 702, to perform the following operations:

sending time-frequency resource indication information to a first terminal by using the transceiver 703, where the time-frequency resource indication information is used to indicate that a first time-frequency resource has been allocated by the base station to a second terminal, a time domain of the first time-frequency resource is a part of a time domain of a second time-frequency resource, and the second time-frequency resource is a time-frequency resource allocated by the base station to the first terminal for data transmission; and performing, by using the transceiver 703, data transmission with the first terminal by using a time-frequency resource that is in the second time-frequency resource and that does not overlap the first time-frequency resource.

In the foregoing operations, after the base station 70 allocates the second time-frequency resource to the first terminal, if the base station 70 allocates the first time-frequency resource to the second terminal according to a short-latency service requirement, and the first time-frequency resource and the second time-frequency resource overlap, the first terminal performs data transmission by using the time-frequency resource that is in the second time-frequency resource and that does not overlap the first time-frequency resource, so that not only time-frequency resource utilization is improved, but also timely processing of a short-latency service is ensured.

In an optional solution, that the processor 701 sends the time-frequency resource indication information to the first terminal by using the transceiver 703 is specifically:

sending the time-frequency resource indication information to the first terminal on a physical downlink control channel PDCCH in a $k^{th}$ subframe by using the transceiver 703, where the time domain of the first time-frequency resource is in a $(k-u)^{th}$ subframe, both k and u are positive integers, and k>u.

In another optional solution, the time domain of the first time-frequency resource equals to an $m^{th}$ preset transmission time unit, and that the processor 701 sends the time-frequency resource indication information to the first terminal by using the transceiver 703 is specifically:

sending the time-frequency resource indication information to the first terminal on a control channel of an $n^{th}$ preset transmission time unit by using the transceiver 703, where both m and n are positive integers, and m<n.

In another optional solution, the time-frequency resource indication information is used to indicate that the first time-frequency resource has been allocated by the base station to the second terminal, and that a third time-frequency resource has been allocated to another terminal, where a time domain of the third time-frequency resource equals to a $t^{th}$ preset transmission time unit, t is a positive integer, t<n, and t is not equal to m.

In another optional solution, the time domain of the first time-frequency resource is equal to an $m^{th}$ preset transmission time unit, and that the processor 701 sends the time-frequency resource indication information to the first terminal by using the transceiver 703 is specifically:

sending the time-frequency resource indication information to the first terminal on a control channel of the $m^{th}$ preset transmission time unit by using the transceiver 703, where m is a positive integer.

In another optional solution, before sending the time-frequency resource indication information to the first terminal by using the transceiver 703, the processor 701 is further configured to:

send time-frequency resource division information to the first terminal by using the transceiver 703, where the time-frequency resource division information is used to indicate that the first time-frequency resource is a time-frequency resource in a preset time-frequency range, and the preset time-frequency range is part time-frequency resources in system bandwidth.

In another optional solution, the time-frequency resource division information is carried in a system information block (SIB).

In another optional solution, the time-frequency resource indication information is downlink control information DCI, and the DCI includes a field indicating the first time-frequency resource.

In another optional solution, a length of the DCI is the same as a length of DCI in a format 1A or a length of DCI in a format 1C.

In another optional solution, when the length of the DCI is the same as the length of the DCI in the format 1A, a scrambling sequence of the DCI is different from a scrambling sequence of the DCI in the format 1A; or when the length of the DCI is the same as the length of the DCI in the format 1C, a scrambling sequence of the DCI is different from a scrambling sequence of the DCI in the format 1C.

In another optional solution, that the processor 701 sends the time-frequency resource indication information to the first terminal by using the transceiver 703 is specifically:

sending the time-frequency resource indication information to a plurality of terminals by using the transceiver 703, where the plurality of terminals include the first terminal.

For specific implementation of the base station 70 described in this embodiment of the present disclosure, refer to the corresponding description in the method embodiment shown in FIG. 3.

According to the base station described in FIG. 7, after the base station 70 allocates the second time-frequency resource to the first terminal, if the base station 70 allocates the first time-frequency resource to the second terminal according to a short-latency service requirement, and the first time-frequency resource and the second time-frequency resource overlap, the first terminal performs data transmission by using the time-frequency resource that is in the second time-frequency resource and that does not overlap the first time-frequency resource, so that not only time-frequency resource utilization is improved, but also timely processing of a short-latency service is ensured.

Figure 8:
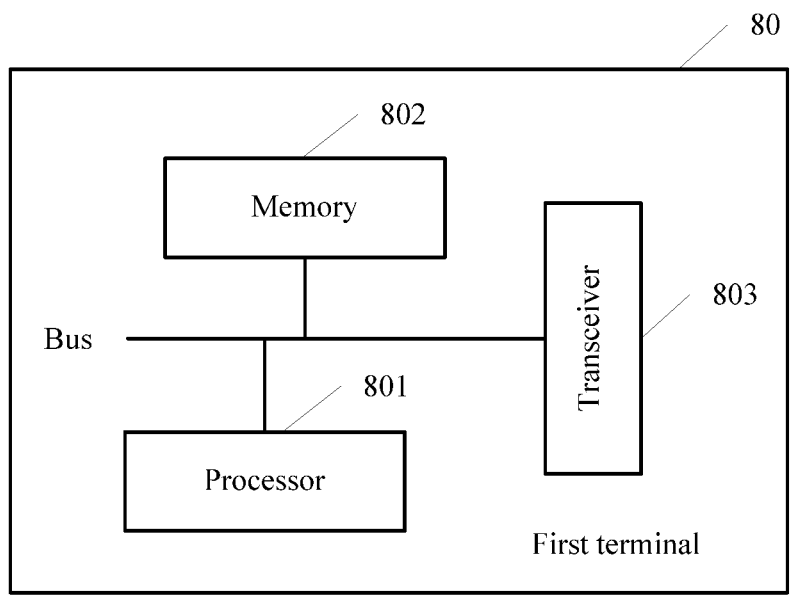
FIG. 8 is a schematic block diagram of a first terminal according to an embodiment of the present disclosure.

FIG. 8 shows a first terminal 80 according to an embodiment of the present disclosure. The first terminal 80 includes a processor 801 (there may be one or more processors 801, and one processor is used as an example in FIG. 8), a memory 802, and a transceiver 803. In some embodiments of the present disclosure, the processor 801, the memory 802, and the transceiver 803 may be connected by using a bus or in another manner. In FIG. 8, a bus connection is used as an example.

The memory 802 is configured to store data and a program.

The processor 801 invokes the program in the memory 802, to perform the following operations:

receiving, by using the transceiver 803, time-frequency resource indication information sent by a base station, where the time-frequency resource indication information is used to indicate that a first time-frequency resource has been allocated by the base station to a second terminal, a time domain of the first time-frequency resource is a part of a time domain of a second time-frequency resource, and the second time-frequency resource is a time-frequency resource allocated by the base station to the first terminal for data transmission; and performing, by using the transceiver 803, data transmission with the base station by using a time-frequency resource that is in the second time-frequency resource and that does not overlap the first time-frequency resource.

According to the first terminal 80 described in FIG. 8, after the base station allocates the second time-frequency resource to the first terminal 80, if the base station allocates the first time-frequency resource to the second terminal according to a short-latency service requirement, and the first time-frequency resource and the second time-frequency resource overlap, the first terminal 80 performs data transmission by using the time-frequency resource that is in the second time-frequency resource and that does not overlap the first time-frequency resource, so that not only time-frequency resource utilization is improved, but also timely processing of a short-latency service is ensured.

In an optional solution, that the processor 801 receives, by using the transceiver 803, the time-frequency resource indication information sent by the base station is specifically:

receiving, by using the transceiver 803, the time-frequency resource indication information sent by the base station on a physical downlink control channel PDCCH in a $k^{th}$ subframe, where the time domain of the first time-frequency resource is in a $(k-u)^{th}$ subframe, both k and u are positive integers, and k>u.

In another optional solution, the time domain of the first time-frequency resource is equal to an $m^{th}$ preset transmission time unit, and that the processor 801 receives, by using the transceiver 803, the time-frequency resource indication information sent by the base station is specifically:

receiving, by using the transceiver 803, the time-frequency resource indication information sent by the base station on a control channel of an $n^{th}$ preset transmission time unit, where both m and n are positive integers, and m<n.

In another optional solution, the time-frequency resource indication information is used to indicate that the first time-frequency resource has been allocated by the base station to the second terminal, and that a third time-frequency resource has been allocated to another terminal, where a time domain of the third time-frequency resource is equal to a $t^{th}$ preset transmission time unit, t is a positive integer, t<n, and t is not equal to m.

In another optional solution, the time domain of the first time-frequency resource is equal to an $m^{th}$ preset transmission time unit, and that the processor 801 receives, by using the transceiver 803, the time-frequency resource indication information sent by the base station is specifically:

receiving, by using the transceiver 803, the time-frequency resource indication information sent by the base station on a control channel of the $m^{th}$ preset transmission time unit, where m is a positive integer.

In another optional solution, before receiving, by using the transceiver 803, the time-frequency resource indication information sent by the base station, the processor 801 is further configured to:

receive, by using the transceiver 803, time-frequency resource division information sent by the base station, where the time-frequency resource division information is used to indicate that the first time-frequency resource is a time-frequency resource in a preset time-frequency range, and the preset time-frequency range is part time-frequency resources in system bandwidth.

In another optional solution, the time-frequency resource division information is carried in a system information block (SIB).

In another optional solution, the time-frequency resource indication information is downlink control information (DCI), and the DCI includes a field indicating the first time-frequency resource.

In another optional solution, a length of the DCI is the same as a length of DCI in a format 1A or a length of DCI in a format 1C.

In another optional solution, when the length of the DCI is the same as the length of the DCI in the format 1A, a scrambling sequence of the DCI is different from a scrambling sequence of the DCI in the format 1A; or when the length of the DCI is the same as the length of the DCI in the format 1C, a scrambling sequence of the DCI is different from a scrambling sequence of the DCI in the format 1C.

For specific implementation of the first terminal 80 described in this embodiment of the present disclosure, refer to the corresponding description in the method embodiment shown in FIG. 3.

According to the first terminal described in FIG. 8, after the base station allocates the second time-frequency resource to the first terminal 80, if the base station allocates the first time-frequency resource to the second terminal according to a short-latency service requirement, and the first time-frequency resource and the second time-frequency resource overlap, the first terminal 80 performs data transmission by using the time-frequency resource that is in the second time-frequency resource and that does not overlap the first time-frequency resource, so that not only time-frequency resource utilization is improved, but also timely processing of a short-latency service is ensured.

Figure 9:
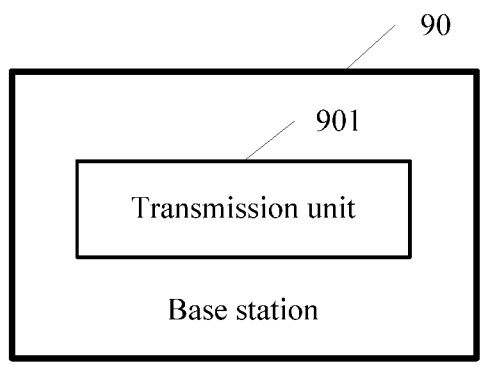
FIG. 9 is a schematic functional diagram of another base station according to an embodiment of the present disclosure.

FIG. 9 is a schematic functional diagram of another base station 90 according to an embodiment of the present disclosure. The base station 90 may include a transmission unit 901. The transmission unit 901 is configured to send time-frequency resource indication information to a first terminal. The time-frequency resource indication information is used to indicate that a first time-frequency resource has been allocated by the base station to a second terminal, a time domain of the first time-frequency resource is a part of a time domain of a second time-frequency resource, and the second time-frequency resource is a time-frequency resource allocated by the base station to the first terminal for data transmission.

The transmission unit 901 is further configured to perform data transmission with the first terminal by using a time-frequency resource that is in the second time-frequency resource and that does not overlap the first time-frequency resource.

By running the foregoing unit, after the base station 90 allocates the second time-frequency resource to the first terminal, if the base station 90 allocates the first time-frequency resource to the second terminal according to a short-latency service requirement, and the first time-frequency resource and the second time-frequency resource overlap, the first terminal performs data transmission by using the time-frequency resource that is in the second time-frequency resource and that does not overlap the first time-frequency resource, so that not only time-frequency resource utilization is improved, but also timely processing of a short-latency service is ensured.

In an optional solution, that the transmission unit 901 sends the time-frequency resource indication information to the first terminal is specifically:

sending the time-frequency resource indication information to the first terminal on a physical downlink control channel PDCCH in a $k^{th}$ subframe, where the time domain of the first time-frequency resource is in a $(k-u)^{th}$ subframe, both k and u are positive integers, and k>u.

In another optional solution, the time domain of the first time-frequency resource is equal to an $m^{th}$ preset transmission time unit, and that the transmission unit 901 sends the time-frequency resource indication information to the first terminal is specifically:

sending the time-frequency resource indication information to the first terminal on a control channel of an $n^{th}$ preset transmission time unit, where both m and n are positive integers, and m<n.

In another optional solution, the time-frequency resource indication information is used to indicate that the first time-frequency resource has been allocated by the base station to the second terminal, and that a third time-frequency resource has been allocated to another terminal, where a time domain of the third time-frequency resource is equal to a $t^{th}$ preset transmission time unit, t is a positive integer, t<n, and t is not equal to m.

In another optional solution, the time domain of the first time-frequency resource is equal to an $m^{th}$ preset transmission time unit, and that the transmission unit 901 sends the time-frequency resource indication information to the first terminal is specifically:

sending the time-frequency resource indication information to the first terminal on a control channel of the $m^{th}$ preset transmission time unit, where m is a positive integer.

In another optional solution, before the transmission unit 901 sends the time-frequency resource indication information to the first terminal, the transmission unit 901 is further configured to send time-frequency resource division information to the first terminal, where the time-frequency resource division information is used to indicate that the first time-frequency resource is a time-frequency resource in a preset time-frequency range, and the preset time-frequency range is part time-frequency resources in system bandwidth.

In another optional solution, the time-frequency resource division information is carried in a system information block (SIB).

In another optional solution, the time-frequency resource indication information is downlink control information (DCI), and the DCI includes a field indicating the first time-frequency resource.

In another optional solution, a length of the DCI is the same as a length of DCI in a format 1A or a length of DCI in a format 1C.

In another optional solution, when the length of the DCI is the same as the length of the DCI in the format 1A, a scrambling sequence of the DCI is different from a scrambling sequence of the DCI in the format 1A; or when the length of the DCI is the same as the length of the DCI in the format 1C, a scrambling sequence of the DCI is different from a scrambling sequence of the DCI in the format 1C.

In another optional solution, that the transmission unit 901 sends the time-frequency resource indication information to the first terminal is specifically:

sending the time-frequency resource indication information to a plurality of terminals, where the plurality of terminals include the first terminal.

For specific implementation of the transmission unit 901 in this embodiment of the present disclosure, refer to the corresponding description in the method embodiment shown in FIG. 3.

According to the base station 90 shown in FIG. 9, after the base station 90 allocates the second time-frequency resource to the first terminal, if the base station 90 allocates the first time-frequency resource to the second terminal according to a short-latency service requirement, and the first time-frequency resource and the second time-frequency resource overlap, the first terminal performs data transmission by using the time-frequency resource that is in the second time-frequency resource and that does not overlap the first time-frequency resource, so that not only time-frequency resource utilization is improved, but also timely processing of a short-latency service is ensured.

Figure 10:
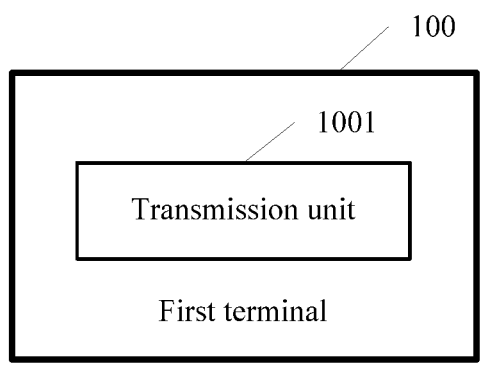
FIG. 10 is a schematic functional diagram of another first terminal according to an embodiment of the present disclosure.

FIG. 10 is a schematic functional diagram of another first terminal 100 according to an embodiment of the present disclosure. The first terminal 100 may include a transmission unit 1001. The transmission unit 1001 receives time-frequency resource indication information sent by a base station. The time-frequency resource indication information is used to indicate that a first time-frequency resource has been allocated by the base station to a second terminal, a time domain of the first time-frequency resource is a part of a time domain of a second time-frequency resource, and the second time-frequency resource is a time-frequency resource allocated by the base station to the first terminal for data transmission.

The transmission unit 1001 is further configured to perform data transmission with the base station by using a time-frequency resource that is in the second time-frequency resource and that does not overlap the first time-frequency resource.

By running the foregoing unit, after the base station allocates the second time-frequency resource to the first terminal 100, if the base station allocates the first time-frequency resource to the second terminal according to a short-latency service requirement, and the first time-frequency resource and the second time-frequency resource overlap, the first terminal 100 performs data transmission by using the time-frequency resource that is in the second time-frequency resource and that does not overlap the first time-frequency resource, so that not only time-frequency resource utilization is improved, but also timely processing of a short-latency service is ensured.

In an optional solution, that the first terminal receives the time-frequency resource indication information sent by the base station includes:

receiving the time-frequency resource indication information sent by the base station on a physical downlink control channel PDCCH in a $k^{th}$ subframe, where the time domain of the first time-frequency resource is in a $(k-u)^{th}$ subframe, both k and u are positive integers, and k>u.

In an optional solution, the time domain of the first time-frequency resource is equal to an $m^{th}$ preset transmission time unit, and that the first terminal receives the time-frequency resource indication information sent by the base station includes:

receiving the time-frequency resource indication information sent by the base station on a control channel of an $n^{th}$ preset transmission time unit, where both m and n are positive integers, and m<n.

In an optional solution, the time-frequency resource indication information is used to indicate that the first time-frequency resource has been allocated by the base station to the second terminal, and that a third time-frequency resource has been allocated to another terminal, where a time domain of the third time-frequency resource is equal to a $t^{th}$ preset transmission time unit, t is a positive integer, t<n, and t is not equal to m.

In another optional solution, the time domain of the first time-frequency resource is equal to an $m^{th}$ preset transmission time unit, and that the first terminal receives the time-frequency resource indication information sent by the base station includes:

receiving the time-frequency resource indication information sent by the base station on a control channel of the $m^{th}$ preset transmission time unit, where m is a positive integer.

In another optional solution, before the first terminal receives the time-frequency resource indication information sent by the base station, the first terminal is further configured to:

receive time-frequency resource division information sent by the base station, where the time-frequency resource division information is used to indicate that the first time-frequency resource is a time-frequency resource in a preset time-frequency range, and the preset time-frequency range is part time-frequency resources in system bandwidth.

In another optional solution, the time-frequency resource division information is carried in a system information block (SIB).

In another optional solution, the time-frequency resource indication information is downlink control information (DCI), and the DCI includes a field indicating the first time-frequency resource.

In another optional solution, a length of the DCI is the same as a length of DCI in a format 1A or a length of DCI in a format 1C.

In another optional solution, when the length of the DCI is the same as the length of the DCI in the format 1A, a scrambling sequence of the DCI is different from a scrambling sequence of the DCI in the format 1A; or when the length of the DCI is the same as the length of the DCI in the format 1C, a scrambling sequence of the DCI is different from a scrambling sequence of the DCI in the format 1C.

For specific implementation of the transmission unit 1001 in this embodiment of the present disclosure, refer to the corresponding description in the method embodiment shown in FIG. 3.

According to the first terminal 100 described in FIG. 10, after the base station allocates the second time-frequency resource to the first terminal 100, if the base station allocates the first time-frequency resource to the second terminal according to a short-latency service requirement, and the first time-frequency resource and the second time-frequency resource overlap, the first terminal 100 performs data transmission by using the time-frequency resource that is in the second time-frequency resource and that does not overlap the first time-frequency resource, so that not only time-frequency resource utilization is improved, but also timely processing of a short-latency service is ensured.

The method and the apparatus in the embodiments of the present disclosure are described in detail above. To help better implement the foregoing solutions in the embodiments of the present disclosure, a related system in an embodiment of the present disclosure is correspondingly provided below.

Figure 11:
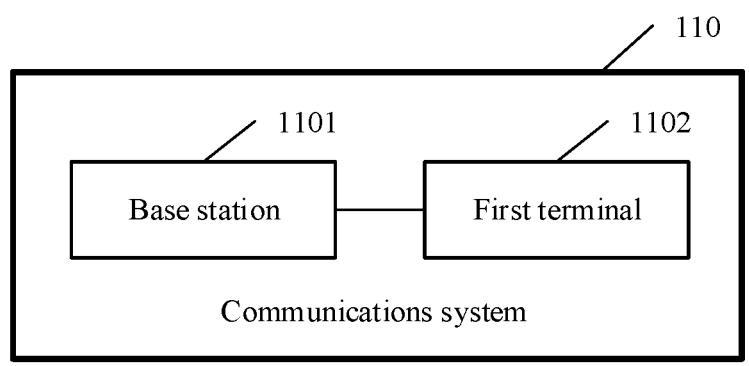
FIG. 11 is a schematic diagram of a communications system according to an embodiment of the present disclosure.

FIG. 11 is a schematic diagram of a communications system 110 according to an embodiment of the present disclosure. The communications system 110 includes a base station 1101 and a first terminal 1102. The base station 1101 and the first terminal 1102 are described as follows:

The base station 1101 is configured to send time-frequency resource indication information to the first terminal.

The first terminal 1102 is configured to receive the time-frequency resource indication information sent by the base station, where the time-frequency resource indication information is used to indicate that a first time-frequency resource has been allocated by the base station to a second terminal, a time domain of the first time-frequency resource is a part of a time domain of a second time-frequency resource, and the second time-frequency resource is a time-frequency resource allocated by the base station to the first terminal for data transmission.

The base station 1101 is further configured to perform data transmission with the first terminal 1102 by using a time-frequency resource that is in the second time-frequency resource and that does not overlap the first time-frequency resource.

In an optional solution, the base station 1101 is the base station 70 shown in FIG. 7 or the base station 90 shown in FIG. 9, and the first terminal 1102 is the first terminal 80 shown in FIG. 8 or the first terminal 100 shown in FIG. 10.

It should be noted that, for specific implementation of the communications system 110, refer to the method embodiment shown in FIG. 3 and the apparatus embodiments shown in FIG. 7 to FIG. 10.

In the communications system 110 described in FIG. 11, after the base station allocates the second time-frequency resource to the first terminal, if the base station allocates the first time-frequency resource to the second terminal according to a short-latency service requirement, and the first time-frequency resource and the second time-frequency resource overlap, the first terminal performs data transmission by using the time-frequency resource that is in the second time-frequency resource and that does not overlap the first time-frequency resource, so that not only time-frequency resource utilization is improved, but also timely processing of a short-latency service is ensured.

In conclusion, by implementing the embodiments of the present disclosure, after the base station allocates the second time-frequency resource to the first terminal, if the base station allocates the first time-frequency resource to the second terminal according to a short-latency service requirement, and the first time-frequency resource and the second time-frequency resource overlap, the first terminal performs data transmission by using the time-frequency resource that is in the second time-frequency resource and that does not overlap the first time-frequency resource, so that not only time-frequency resource utilization is improved, but also timely processing of a short-latency service is ensured.

All or some of the processes of the methods in the embodiments may be implemented by a computer program instructing relevant hardware. The program may be stored in a computer readable storage medium. When the program runs, the processes of the methods in the embodiments are performed. The foregoing storage medium includes any medium that can store program code, such as a ROM, a RAM, a magnetic disk, or an optical disc.

What is disclosed above is merely example embodiments of the present disclosure, and certainly is not intended to limit the protection scope of the present disclosure. All or some of processes that implement the foregoing embodiments and equivalent modifications made in accordance with the claims of the present disclosure shall fall within the scope of the present disclosure.

What is claimed is:

1. A method for performing a data communication using time-frequency resources allocated to a terminal device, comprising:
    receiving, by the terminal device from a base station, time-frequency resource allocation information and time-frequency resource division information, wherein the time-frequency resource allocation information indicates time-frequency resources allocated to the terminal device for performing the data communication, and the time-frequency resource division information indicates a division of a time-frequency resource that is allowed to be used by another data communication, wherein the division of the time-frequency resource comprises one or more resource units in time domain and one or more resource units in frequency domain;
    receiving, by the terminal device from the base station, time-frequency resource indication information, wherein the time-frequency resource indication information indicates that, in the time-frequency resource that is allowed to be used by the other data communication, at least one time domain resource unit and at least one frequency domain resource unit are occupied by the other data communication, wherein the at least one time domain resource unit and the at least one frequency domain resource unit that are occupied by the other data communication belong to the time-frequency resources allocated for performing the data communication but preempted for the other data communication; and
    performing, by the terminal device, the data communication with the base station using at least one time-frequency resource, the at least one time-frequency resource being among the allocated time-frequency resources except the at least one time domain resource unit and at least one frequency domain resource unit that are occupied by the other data communication.

2. The method according to claim 1, wherein the time-frequency resource indication information is a time-frequency resource indication message, wherein the time-frequency resource indication message comprises a time domain field indicating the at least one time domain resource unit in the time-frequency resource that is occupied by the other data communication.

3. The method according to claim 1, wherein the time-frequency resource indication information is a time-frequency resource indication message, wherein the time-frequency resource indication message comprises a frequency domain field indicating the at least one frequency domain resource unit in the time-frequency resource that is occupied by the other data communication.

4. The method according to claim 1, wherein the time-frequency resource indication information is a time-frequency resource indication message, wherein the time-frequency resource indication message comprises a field indicating the at least one time domain resource unit and the at least one frequency domain resource unit that are occupied by the other data communication.

5. An apparatus for performing a data communication, comprising:
    a memory storing program instructions and at least one processor coupled with the memory,
    wherein the instructions are executed by the at least one processor to cause the apparatus to:
    receive, from a base station, time-frequency resource allocation information and time-frequency resource division information, wherein the time-frequency resource allocation information indicates time-frequency resources allocated to the terminal device for performing the data communication, and the time-frequency resource division information indicates a division of a time-frequency resource that is allowed to be used by another data communication, wherein the division of the time-frequency resource comprises one or more resource units in time domain and one or more resource units in frequency domain;
    receive from the base station, time-frequency resource indication information, wherein the time-frequency resource indication information indicates that, in the time-frequency resource that is allowed to be used by the other data communication, at least one time domain resource unit and at least one frequency domain resource unit are occupied by the other data communication, wherein the at least one time domain resource unit and the at least one frequency domain resource unit that are occupied by the other data communication belong to the time-frequency resources allocated for performing the data communication but preempted for the other data communication; and
    perform the data communication with the base station using at least one time frequency resource, the at least one time-frequency resource being among the allocated time-frequency resources except the at least one time domain resource unit and the at least one frequency domain resource unit that are occupied by the other data communication.

6. The apparatus according to claim 5, wherein time-frequency resource indication information is a time-frequency resource indication message, wherein the time-frequency resource indication message comprises a time domain field indicating the at least one time domain resource unit in the time-frequency resource that is occupied by the other data communication.

7. The apparatus according to claim 5, wherein time-frequency resource indication information is a time-frequency resource indication message, wherein the time-frequency resource indication message comprises a frequency domain field indicating the at least one frequency domain resource unit in the time-frequency resource that is occupied by the other data communication.

8. The apparatus according to claim 5, wherein the time-frequency resource indication information is a time-frequency resource indication message, wherein the time-frequency resource indication message comprises a field indicating the at least one time domain resource unit and the at least one frequency domain resource unit that are occupied by the other data communication.

9. A method for performing a data communication using time-frequency resources allocated to a terminal device, comprising:
   sending, by a base station to the terminal device, time-frequency resource allocation information and time-frequency resource division information, wherein the time-frequency resource allocation information indicates time-frequency resources allocated to the terminal device for performing the data communication, and the time-frequency division information indicates a division of a time-frequency resource that is allowed to be used by another data communication, wherein the division of the time-frequency resource comprises one or more resource units in time domain and one or more resource units in frequency domain;
   sending, by the base station, time-frequency resource indication information, wherein the time-frequency resource indication information indicates that, in the time-frequency resource that is allowed to be used by the other data communication, at least one time domain resource unit and at least one frequency domain resource unit are occupied by the other data communication, wherein the at least one time domain resource unit and the at least one frequency domain resource unit that are occupied by the other data communication belong to the time-frequency resources allocated for performing the data communication but preempted for the other data communication; and
   performing, by the base station, the data communication with the terminal device using at least one time-frequency resource, the at least one time-frequency resource being among the allocated time-frequency resources except the at least one time domain resource unit and the at least one frequency domain resource unit that are occupied by the other data communication.

10. The method according to claim 9, wherein the time-frequency resource indication information is a time-frequency resource indication message, wherein the time-frequency resource indication message comprises a time domain field indicating the at least one time domain resource unit in the time-frequency resource that is occupied by the other data communication.

11. The method according to claim 9, wherein the time-frequency resource indication information is a time-frequency resource indication message, wherein the time-frequency resource indication message comprises a frequency domain field indicating the at least one frequency domain resource unit in the time-frequency resource that is occupied by the other data communication.

12. The method according to claim 9, wherein the time-frequency resource indication information is a time-frequency resource indication message, wherein the time-frequency resource indication message comprises a field indicating the at least one time domain resource unit and the at least one frequency domain resource unit that are occupied by the other data communication.

13. An apparatus for performing a data communication, comprising:
   a memory storing program instructions and at least one processor coupled with the memory,
   wherein the instructions are executed by the at least one processor to cause the apparatus to:
      send to a terminal device, time-frequency resource allocation information and time-frequency resource division information, wherein the time-frequency resource allocation information indicates time-frequency resources allocated to the terminal device for performing the data communication, and the time-frequency division information indicates a division of a time-frequency resource that is allowed to be used by other another data communication, wherein the division of the time-frequency resource comprises one or more resource units in time domain and one or more resource units in frequency domain;
      send to the terminal device, time-frequency resource indication information, wherein the time-frequency resource indication information indicates that, in the time-frequency resource that is allowed to be used by the other data communication, at least one time domain resource unit and at least one frequency domain resource unit are occupied by the other data communication, wherein the at least one time domain resource unit and the at least one frequency domain resource unit that are occupied by the other data communication belong to the time-frequency resources allocated for performing the data communication but preempted for the other data communication; and
      perform the data communication with the terminal device using at least one time-frequency resource, the at least one resource being among the allocated time-frequency resources except the at least one time domain resource unit and the at least one frequency domain resource unit that are occupied by the other data communication.

14. The apparatus according to claim 13, wherein the time-frequency resource indication information is a time-frequency resource indication message, wherein the time-frequency resource indication message comprises a time domain field indicating the at least one time domain resource unit in the time-frequency resource that is occupied by the other data communication.

15. The apparatus according to claim 13, wherein the time-frequency resource indication information is a time-frequency resource indication message, wherein the time-frequency resource indication message comprises a frequency domain field indicating the at least one frequency domain resource unit in the time-frequency resource that is occupied by the other data communication.

16. The apparatus according to claim 13, wherein the time-frequency resource indication information is a time-frequency resource indication message, wherein the time-frequency resource indication message comprises a field indicating the at least one time domain resource unit and the at least one frequency domain resource unit that are occupied by the other data communication.

* * * * *